United States Patent
Kochura et al.

(10) Patent No.: US 11,621,881 B2
(45) Date of Patent: Apr. 4, 2023

(54) ERROR DETECTION AND BROADCASTING USING PARTNER SENSORS

(71) Applicant: International Business Machines Corporation, Armonk, NY (US)

(72) Inventors: Nadiya Kochura, Bolton, MA (US); Tiberiu Suto, Franklin, NY (US); Nicolo' Sgobba, Brno (CZ); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 16/785,788

(22) Filed: Feb. 10, 2020

(65) Prior Publication Data
US 2021/0250224 A1    Aug. 12, 2021

(51) Int. Cl.
*H04L 41/0604*    (2022.01)
*H04L 41/0631*    (2022.01)
(Continued)

(52) U.S. Cl.
CPC .......... *H04L 41/0618* (2013.01); *G16Y 40/10* (2020.01); *G16Y 40/20* (2020.01);
(Continued)

(58) Field of Classification Search
CPC ............. H04L 41/0618; H04L 41/0631; H04L 43/0823; H04L 41/069; H04L 41/0686; G16Y 40/20; G16Y 40/10
See application file for complete search history.

(56) References Cited

U.S. PATENT DOCUMENTS

| | | | | |
|---|---|---|---|---|
| 5,684,807 A | * | 11/1997 | Bianchini, Jr. | ......... H04L 69/40 |
| | | | | 714/4.2 |
| 7,373,225 B1 | * | 5/2008 | Grier | ...................... G07C 5/008 |
| | | | | 340/439 |

(Continued)

FOREIGN PATENT DOCUMENTS

| | | |
|---|---|---|
| CN | 101860883 B | 10/2012 |
| CN | 108199899 A | 6/2018 |
| WO | 2019005323 A1 | 1/2019 |

OTHER PUBLICATIONS

Postcapes, IoT Standards and Protocols, 2019 Comparisions on Network, Wireless Comms, Security, Industrial, Nov. 27, 2019, https://www.postscapes.com/internet-of-things-protocols/#protocols.

(Continued)

*Primary Examiner* — Kevin T Bates
*Assistant Examiner* — Ranjan Pant
(74) *Attorney, Agent, or Firm* — Garg Law Firm, PLLC; Rakesh Garg; Michael O'Keefe

(57) ABSTRACT

A method that includes joining, by a first node, a network connecting a set of nodes, where each node has an agent and is associated with a sensor, and where the sensor generates sensor data, and where each agent sends and receives broadcast messages, and generating, by the sensor, sensor data associated with a second node. The method also includes analyzing, by the agent, the sensor data, where the analyzing causes a detection of a first fault condition of the second node, and where the first fault condition is an indication of a problem with the second node, generating, by the agent, a broadcast message, where the broadcast message includes the first fault condition, and sending, by the first node, the broadcast message to at least one member of the set of nodes via the network.

17 Claims, 6 Drawing Sheets

(51) Int. Cl.
  *G16Y 40/20* (2020.01)
  *H04L 43/0823* (2022.01)
  *G16Y 40/10* (2020.01)
  *H04L 41/069* (2022.01)

(52) U.S. Cl.
  CPC ........ *H04L 41/069* (2013.01); *H04L 41/0631* (2013.01); *H04L 43/0823* (2013.01)

(56) References Cited

U.S. PATENT DOCUMENTS

| | | | |
|---|---|---|---|
| 7,769,848 B2 | 8/2010 | Choy et al. | |
| 8,244,260 B2 | 8/2012 | Silverstrim et al. | |
| 9,804,913 B2 | 10/2017 | Dasari | |
| 10,180,871 B2 * | 1/2019 | Mills | G06F 11/079 |
| 2004/0249610 A1 * | 12/2004 | Ohsie | H04L 41/0631 714/25 |
| 2011/0255418 A1 * | 10/2011 | van Greunen | H04L 41/064 370/242 |
| 2016/0266957 A1 * | 9/2016 | Mills | G06F 11/0727 |
| 2017/0006141 A1 | 1/2017 | Bhadra | |
| 2017/0091007 A1 * | 3/2017 | Dasari | G06F 11/0772 |
| 2017/0168502 A1 * | 6/2017 | Gordon | B60K 28/14 |
| 2017/0289752 A1 * | 10/2017 | Onishi | H04W 40/22 |
| 2018/0088983 A1 * | 3/2018 | Demchenko | H04L 41/0654 |
| 2018/0096602 A1 * | 4/2018 | She | B60W 10/04 |
| 2019/0004884 A1 | 1/2019 | Kirshenbaum et al. | |
| 2019/0029065 A1 * | 1/2019 | Park | H04W 76/18 |
| 2019/0075447 A1 * | 3/2019 | Lee | H04W 4/40 |
| 2019/0132709 A1 * | 5/2019 | Graefe | G08G 1/0133 |
| 2019/0139422 A1 * | 5/2019 | Cheah | G01S 1/02 |
| 2019/0215694 A1 | 7/2019 | Rubin et al. | |
| 2020/0043342 A1 * | 2/2020 | Cunningham | H04W 4/80 |
| 2020/0076676 A1 * | 3/2020 | Yang | G07C 5/0816 |
| 2021/0179121 A1 * | 6/2021 | Lopez | B60W 50/038 |

OTHER PUBLICATIONS

Stanford-Clark et al., "MQTT for Sensor Networks (MQTT-SN) Protocol Specification", Version 1.2, International Business Machines Corporation, Nov. 14, 2013, mqtt.org/new/wp-content/uploads/2009/06/MQTT-SN_spec_v1.2.pdf.

* cited by examiner

ERROR DETECTION AND BROADCASTING USING PARTNER SENSORS

TECHNICAL FIELD

The present invention relates generally to a method, computer program product, and system in the field of networking sensors. More particularly, the present invention relates to a method, computer program product, and system for reporting sensor information to other nodes via a network.

BACKGROUND

A sensor is a device, machine, system, or component that detects and measures the physical property of objects. Some sensors detect changes within the sensor's field of view (FOV), while other sensors detect changes in the ambient environment they are used in. Sensors are designed to detect a variety of properties, including visual, auditory, smell, voltage, color, proximity, radiation, motion and the like. Sensors often measure speed, fluid flow, temperature, humidity, pressure, the presence of light, chemical detection, and the like. Sensors are used to monitor the performance and operation of an object in a given environment and generate a response due to changes in that environment. In some embodiments, sensors are sensitive to multi-spectral emissions, thus able to detect a variety of changes in their environment simultaneously and generate a wide range of responses.

In some embodiments, sensors are hardware devices, while in other embodiments, sensors reside in software or firmware and monitor changes to executable code, memory contents, and the like. As an example, a motion sensor generates a current when an object moves within the sensor's FOV and sensor range. Another example includes a sensor designed to gather light in the visible spectrum and generating a signal whenever the color red is detected. In the present embodiment, whenever a sensor detects a change, the sensor generates a response, which is termed "sensor data". In yet another example, a Hall Effect sensor is designed to generate a current spike in the presence of a moving magnet within range of the sensor. A Hall Effect sensor is useful for counting the number of revolutions of a bicycle tire when a magnet is attached to the rim of the tire. In some embodiments, sensor data is a voltage or current signal, while in other embodiments, the sensor data includes metadata containing a timestamp, information on the location/direction of the detected change, and the like. Sensors often send sensor data to a computer system or processor for analysis. Within the scope of the illustrative embodiments, all types of sensors can be used without limitation as disclosed herein.

A partner sensor is a sensor that communicates with other sensors that share a common communications network. The partner sensors can be co-located on the same machine, and can be independent of each other. As an example, a collection of stationary traffic cameras monitoring vehicle flow work together to detect driving conditions at an intersection, with each traffic camera working independently of other traffic cameras. Thus, the individual sensors, while independent of each other, are partner sensors in that each sensor sends their sensor data to a common authority for analysis. Partner sensors can be of any type, and need not be the same type, style, or generate the same type of sensor data.

Within the scope of the illustrated embodiments, a sensor is partnered with other independent sensors to form a network of sensors in various environments, such as vehicle traffic on a roadway, mobile machines moving within a factory, computer devices located within a smart home, and the like. Some partner sensors are connected to each other, for example when they are part of a single integrated system or device. An integrated system can connect various sensors together via electrical connections, a network connection, common software controls, and the like. In some embodiments, partner sensors are located with other sensors associated with stationary or mobile devices within a defined sensor range. Partner sensors can communicate with other sensors by using wired or wireless data communications protocols by transmitting and receiving messages to and from other sensors and sensor networks.

Within the scope of the illustrative embodiments, a local sensor is a sensor associated with a specific local vehicle, machine, or device, hereinafter termed a "node". According to some embodiments, a node is associated with a sensor, or a component configured to establish connectivity with a sensor. Thus, a vehicle with sensors traveling along a road is a node, as is a mobile machine moving supplies within a factory floor. In another example, a smart home that receives sensor data from sensors via a communications network is also a node. A distant sensor is a sensor associated with any node that is not a local node. A node can also be a stationary monitoring sensor such as a traffic camera, a building security camera, and the like. Local sensors are associated with a user's own node while a distant sensor is located in a node over which the user has no control or authority. A common characteristic of all nodes is the ability to send and/or receive broadcast messages via a network protocol.

Each node includes an agent. According to some embodiments, the agent is configured to both analyze sensor data and to transmit and receive broadcast messages containing sensor data. An agent can be a hardware circuit or device, or can be a software function within a computer processor. Other embodiments are possible and are not limiting by these examples.

SUMMARY

The illustrative embodiments provide a method, computer program product, and system. An embodiment includes a method that includes joining, by a first node, a communications network connecting a set of nodes, where each node has an agent and is associated with a sensor, and where the sensor generates sensor data, and where each agent sends and receives broadcast messages, and generating, by the sensor, sensor data associated with a second node. The method also includes analyzing, by the agent, the sensor data, where the analyzing causes a detection of a first fault condition of the second node, and where the first fault condition is an indication of a problem with the second node, generating, by the agent, a broadcast message, where the broadcast message includes the first fault condition, and sending, by the first node, the broadcast message to at least one member of the set of nodes via the network.

An embodiment includes a computer usable program product for generating a broadcast message containing sensor data pertaining to a fault condition, that includes one or more computer readable storage media, and program instructions collectively stored on the one or more computer readable storage media, the program instructions made of program instructions to join, by a first node, a communications network connecting a set of nodes, where each node in the set of nodes has an agent and is associated with a sensor, and where the sensor of each node generates sensor data, and where each node's agent sends and receives broadcast messages, program instructions to generating, by the first node sensor, sensor data associated with a second node, program instructions to analyze, by the first node agent, the sensor data associated with the second node, where the analyzing causes a detection of a first fault condition associated with the second node, and where the first fault condition is an indication of a problem with the second node, program instructions to generate, by the first node agent, a broadcast message, where the broadcast message includes the first fault condition detected by the first node agent, and program instructions to send, by the first node, the broadcast message to at least one member of the set of nodes via the network.

An embodiment includes a computer system. The computer system includes one or more processors, one or more computer-readable memories, one or more computer-readable storage devices, one or more internal sensors, and an agent that is made of a listener module, where a broadcast message is detected, a filter module, where the broadcast message is interpreted to determine whether the agent is an intended destination of the broadcast message, an interface to internal sensors, where the interface to internal sensors functions to enable connectivity among sensors in a first node, and an interface to external nodes, where the interface to external nodes functions to enable connectivity among different nodes in a given network of nodes. The program instructions include to join, by a first node, a communications network connecting a set of nodes, where each node in the set of nodes has an agent and is associated with a sensor, and where the sensor associated with each node generates sensor data, and where each node's agent sends and receives broadcast messages, program instructions to generate, by the first node sensor, sensor data associated with a second node, program instructions to analyze, by the first node agent, the sensor data associated with the second node, where the analyzing causes a detection of a first fault condition associated with the second node, and where the first fault condition is an indication of a problem with the second node, program instructions to generate, by the first node agent, a broadcast message, where the broadcast message includes the first fault condition detected by the first node agent, and program instructions to send, by the first node, the broadcast message to at least one member of the set of nodes via the network.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
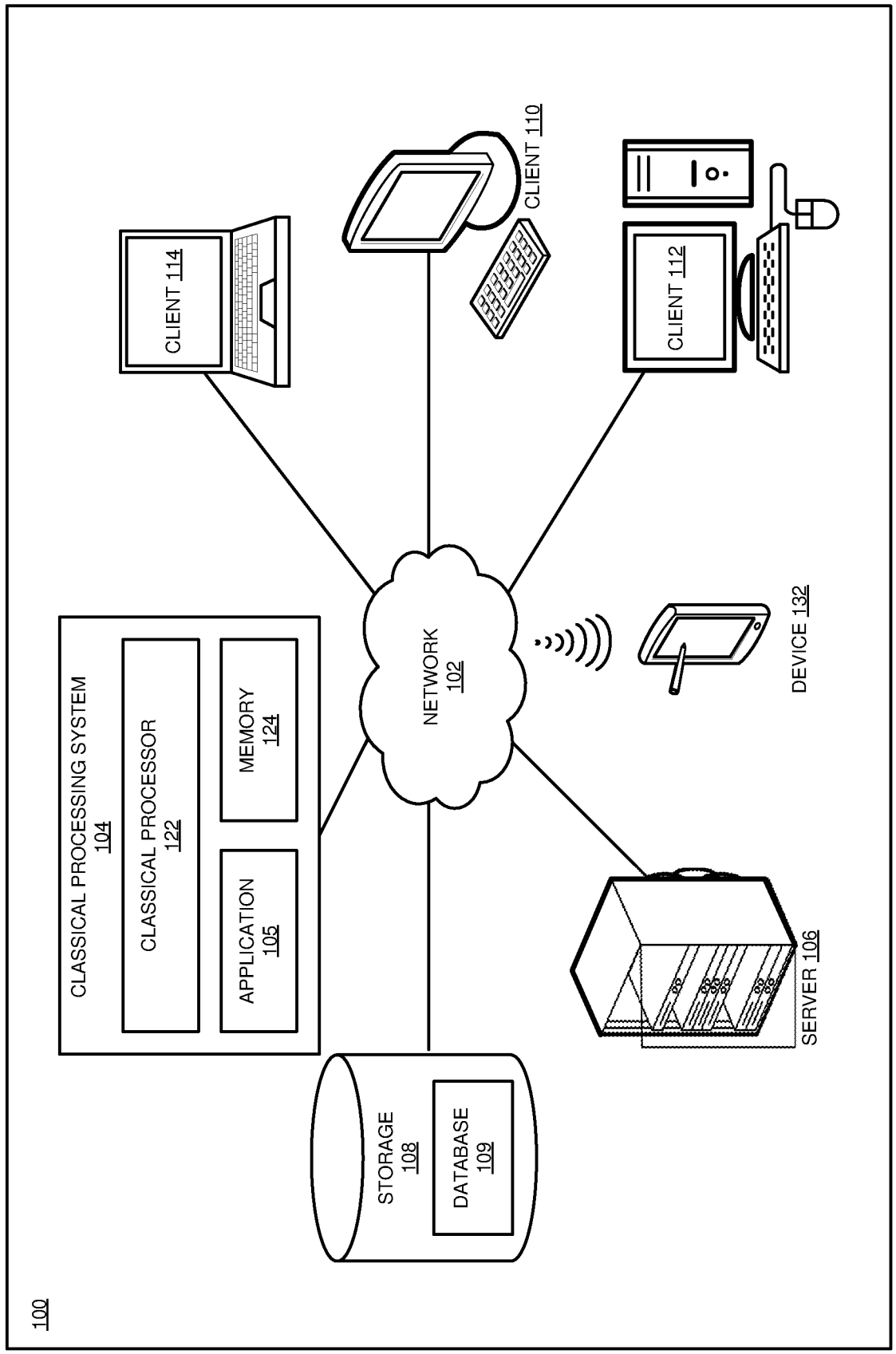
FIG. 1 depicts a block diagram of a network of data processing systems in which illustrative embodiments may be implemented.

The illustrative embodiments recognize that there is a need to detect a fault condition that occurs with a node using sensors in various environments. In some embodiments, a fault can be detected by a local node viewing the fault of another node from a distance using local sensors. Additionally, there is a need for nodes to receive and send messages to a distant node when a fault is detected from a distance. Finally, there is a need to detect both a fault with a distant node, and also to detect a fault with the distant node's own sensors that fail to detect the distant node's fault condition. As an example relating to a transportation environment, a user's vehicle that is enabled by an illustrative embodiment is driven behind a distant vehicle, where the user's vehicle camera sensors detect the distant vehicle slow at a red traffic light. However, the user's sensor also detects that the distant vehicle did not display a brake light when slowing. Thus, the user's vehicle detected both a fault condition with the distant vehicle and a second fault condition with the distant vehicle's own sensors.

In some embodiments, the node does not have any onboard sensors at all, but does include an agent for receiving broadcast messages from other nodes. A node without sensors but with an agent can still receive sensor data from other nodes and respond as described herein. The agent is described in greater detail in FIG. 4 as disclosed herein.

The illustrative embodiments recognize that there is a need for having a network of nodes sharing sensor data which require methods and systems to detect faulty equipment and associated faulty sensors, and the ability to broadcast information related to the faulty equipment and sensors to every node connected to the network. The broadcast enables a distant node to be alerted to a fault condition, and to enable corrective actions to repair or mitigate the fault condition.

The network connecting the nodes can be of any acceptable protocol. One such protocol is the Internet of Things (IoT) or Massive IoT (MIoT), which are designed specifically for machine-to-machine and mobile applications (e.g., Message Queueing Telemetry Transport for Sensor Networks (MQTT-SN)). A majority of these existing protocols act on top of the transmission control protocol (TCP) for supplying reliable streams of data. Furthermore, the illustrative embodiments are implemented with respect to any type of data, data source, or access to a data source over a data network. Any type of data computer system device can provide the data to an illustrated embodiment, either locally at a data processing system or over a data network within the scope of the invention. Where an embodiment is described using a mobile device, any type of data computer system device suitable for use with the mobile device can provide the data to such embodiment, either locally at the mobile device or over a data network, within the scope of the illustrative embodiments.

The illustrative embodiments also recognize that there is a lack of a generalized message format for reporting sensor data using an agent that is capable of listening for messages, filtering out messages that are not addressed a host node, and sending messages with sensor data embedded within the message. Furthermore, there is a lack of a standard message format for sending and receiving sensor data across a network.

In operation, the user's node uses onboard (local) sensors to detect a fault condition with another node. For example, a robotic machine in a factory may detect that a security door is open when it should be closed. The sensor data ("door A17 open") is sent to the node's agent, where the agent interprets the sensor data and determines whether the condition is a fault or not. In this example, the open door is a fault. Therefore, the agent generates a broadcast message and transmits the broadcast message to other nodes within the factory, such as other machines, mobile devices, security offices, central control, and the like. The broadcast message must contain information about the fault condition, as well as information on the node generating the message, the intended destination node (if known), a time of transmission, and other context data related to the sensor data collected by the node. Additional details related to the broadcast message are described in FIG. 3.

In another example, in a manufacturing plant operating a production line, a set of sensors at a given position within the production line detects that a part delivery is delayed several seconds. An analysis by the agent associated with the sensors determines that the delay is indicative of a problem in another area of the plant and requires maintenance. Since the other area of the plant did not also sound an alarm, the agent also determines that sensors associated with the part delivery have a problem as well. The agent generates a broadcast message with details about the part, the symptoms, and a likely problem with the sensors in another section of the plant.

In another example, a smart home is configured with a variety of sensors to include smoke detectors, water detectors, security cameras, motion sensors, and temperature sensors, which all share a common network. When a water leak occurs, a water sensor detects the leak and a broadcast message is generated and sent to all nodes on the network. Additionally, as additional sensors determine that a washing machine is the source of the leak, the broadcast message also indicates that sensors within the washing machine failed to detect the leak and therefore, are likely faulty.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in the illustrated embodiments are used only for the clarity of the description and are not limiting to the illustrative embodiments. Additional data, operations, actions, tasks, activities, and manipulations will be conceivable from this illustrative embodiments and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications.

Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
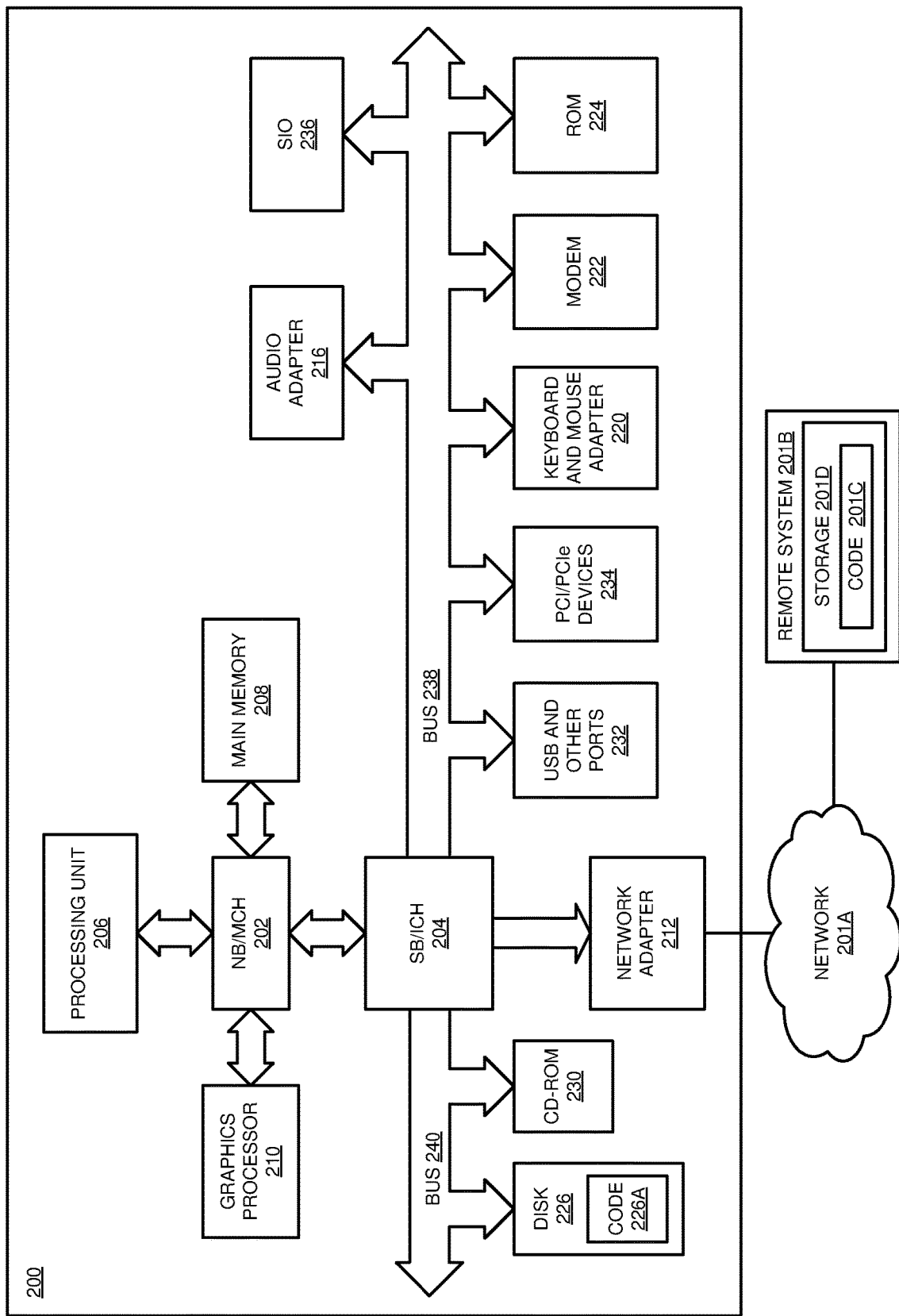
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as classical processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
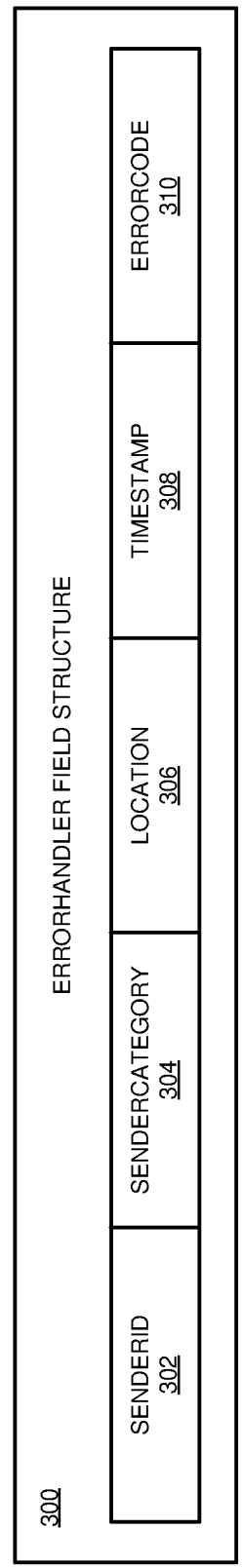
FIG. 3 depicts an example communications protocol return code field for sensor-related broadcast messages in accordance with an illustrative embodiment.

FIG. 3 depicts an example communications protocol return code ErrorHandler field structure 300 for sensor-related broadcast messages in accordance with an illustrative embodiment. The ErrorHandler field structure 300 includes a Sender Identification (ID) code 302, a Sender Category code 304, a Location code 306, a Timestamp code 308, and an Error Code 310. In some embodiments, additional codes are included in the ErrorHandler field structure 300, and this example is not limiting. The Sender ID code 302 contains identification information on the node that generates the broadcast message and transmits the message using the network, such as network 102 of FIG. 1. The SenderID code 302 can be a binary value, a decimal number, a name, a dynamically-assigned temporary identifier, and the like and works to identify the node transmitting the broadcast message. The Sender Category code 304 is used to identify the broadcast message, and includes, but is not limited to a status message, a fault detection message, an acknowledgement message, a handshaking message, and the like. The Location code 306 includes data on the current location of the node generating and transmitting the broadcast message. The location data can include GPS data, map coordinate data, location with reference to a known reference point, etc. Next, the Timestamp code 308 includes the time of the broadcast message generation and/or the time of transmission of the broadcast message. Finally, the Error code 310 contains information about the fault or faults, the identity of the node with the fault, and other contextual data related to the fault condition detected by the node's sensors.

According to some embodiments, the ErrorHandler field structure 300 contains more codes and is customizable as required to meet the requirements of a specific working environment. In some embodiments, the broadcast message can contain empty or "null" code entries if that information cannot be discerned by the agent generating the message. In yet other embodiments, if an agent cannot determine the identity of a distant node with a detected fault condition, the ErrorHandler field structure 300 is broadcast across the network to every other node to send a message that a fault has been detected but no identity can be made.

According to some embodiments, the ErrorHandler field structure 300 also includes analytics data associated with the fault condition and the associated node. According to some embodiments, analytics data associated with the fault condition of sensors includes quality-related information such as communication intervals between data exchange, or could include temperature data if relevant to the context, as well as any other information that is relevant in the given context. In the context of a transportation environment, any information that pertains to health management of nodes in terms of data variation (e.g. performance degradation) with respect to normal operating conditions (i.e. diagnosis data), are considered analytics data associated to the fault condition.

Figure 4:
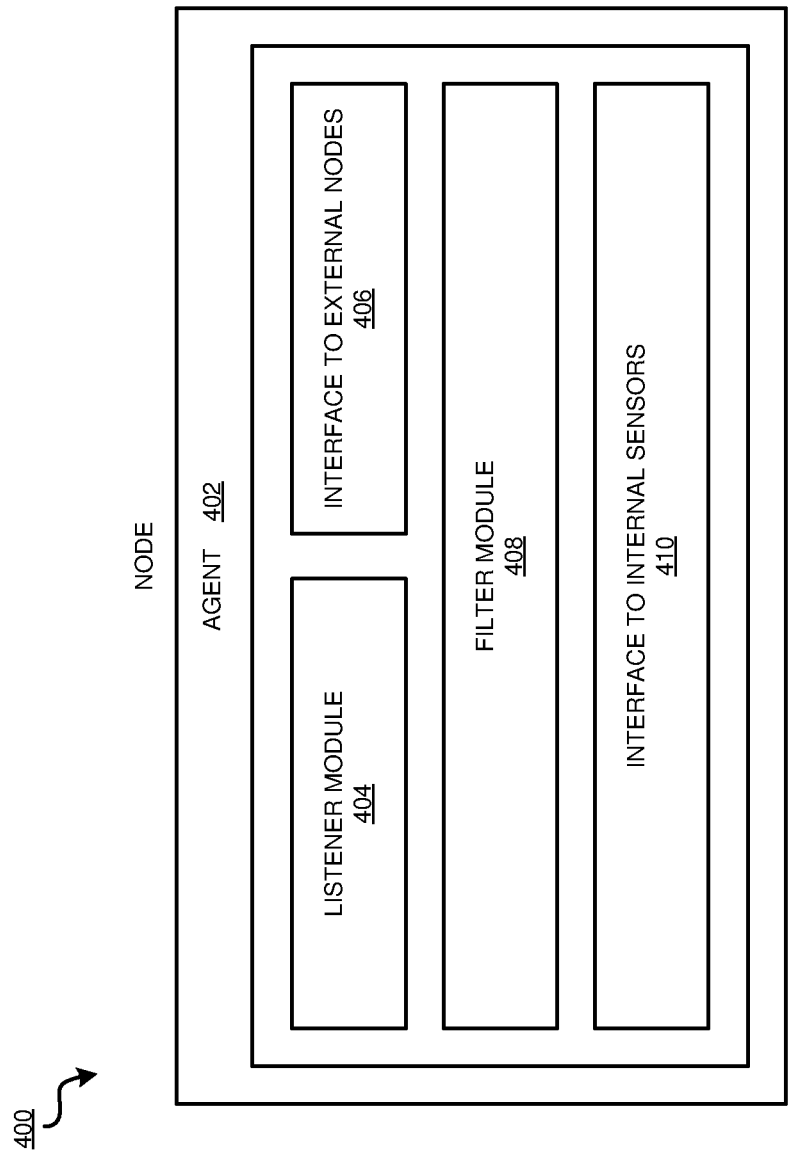
FIG. 4 depicts a block diagram of an agent employed in a node for sending and receiving broadcast messages associated with sensor data in accordance with an illustrative embodiment.

FIG. 4 depicts a block diagram of a node 400 with an agent 402 for sending and receiving broadcast messages associated with sensor data in accordance with an illustrative embodiment. The agent 402 is implemented by the node 400 and is part of each node 400 in the network of nodes 400. In some embodiments, the nodes 400 can be device 132 or client 112 of FIG. 1. The agent 402 includes several functional modules, including a Listener Module 404, an Interface to External Nodes 406, a Filter Module 408, and an Interface to Internal Sensors 410. The Listener Module 404 monitors incoming broadcast messages, and alerts the agent 402 whenever a broadcast message is received. The Interface to External Nodes 406 enables the connectivity among different nodes 400 connected via the network, such as network 102 of FIG. 1. The Interface to External Nodes 406 also is an interface to an existing or future communications protocol as used by the network. The Filter Module 408 analyzes an incoming broadcast message and determines whether the broadcast message has been directed (addressed) to the host node 400, is addressed to a different node 400, or is a network-wide message directed to all nodes 400 on the network. When the Filter Module 408 determines that an incoming broadcast message is addressed to the host node 400, the Filter Module 408 sends a signal to the agent 402 indicating that a message has been received that is directed to the host node 400. Finally, the Interface to Internal Sensors 410, which enables the connectivity among sensors within the same node 400. The Interface to Internal Sensors 410 also is an interface for the sensors within the node 400 to an existing or future communications protocol as used by the network. In accordance with some embodiments, the node 400 can transmit the broadcast message directly to a controlling authority using radio waves, such as employed by a cell phone system. In other embodiments, the broadcast message is transmitted to a number of other nodes 400 via a radio broadcast signal.

In operation, whenever the sensor on a node 400 detects a fault condition on another node 400, the agent 402 generates the broadcast message containing the ErrorHandler field structure 300. The agent 402 places as much information from the sensor data as possible into the ErrorHandler field structure 300 and transmits the broadcast message to the other nodes 400 using the network as described herein. Other nodes 400, such as a distant node, will receive the broadcast message and filter the broadcast message to determine whether the broadcast message is directed to that distant node 400.

Figure 5:
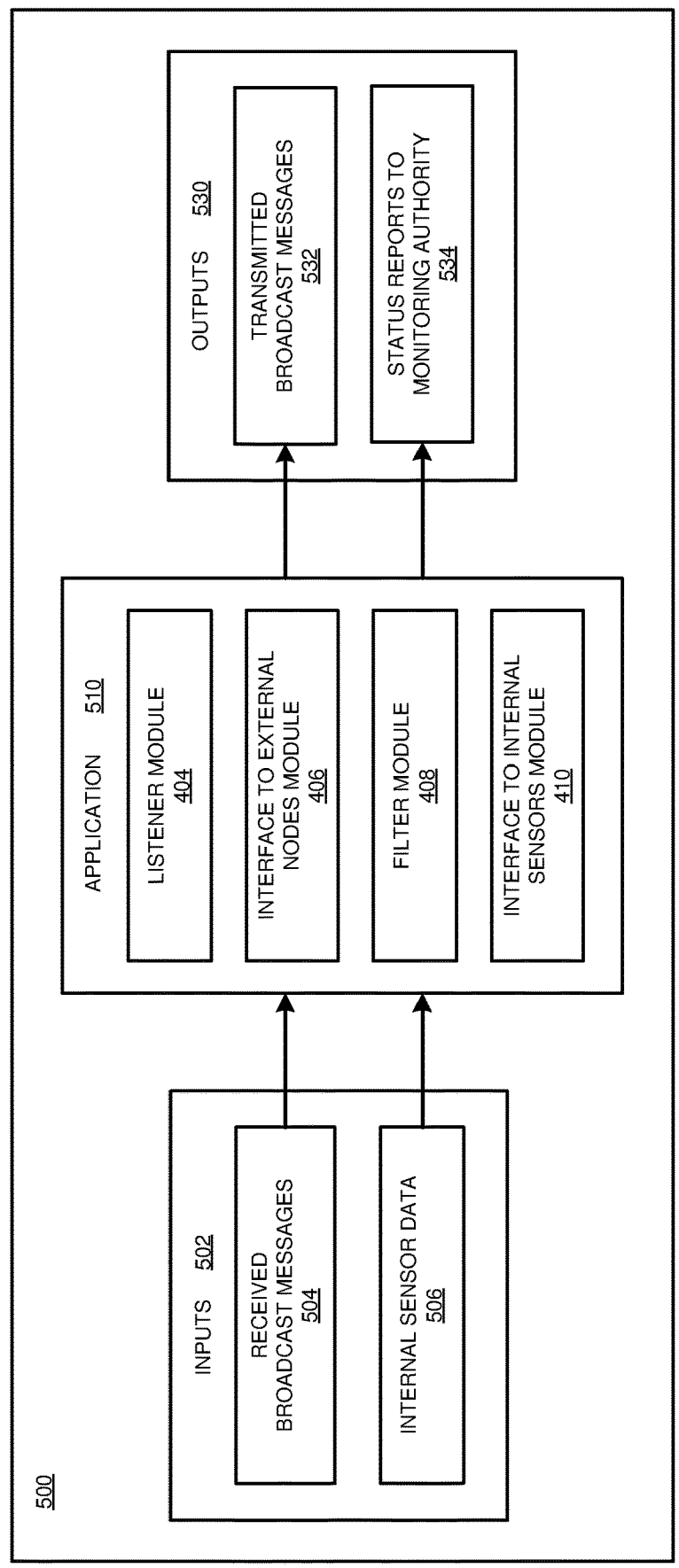
FIG. 5 depicts a block diagram of an example application that runs on a mode for managing sensors and monitoring broadcast messages in accordance with an illustrative embodiment.

FIG. 5 depicts a block diagram of an example application system 500 that operates on a node 400 for managing sensors and monitoring broadcast messages in accordance with an illustrative embodiment. Application system 500 includes inputs 502, an application 510, and outputs 530. Inputs 502 of the application system 502 include received broadcast messages 504 and internal sensor data 506. According to some embodiments, the broadcast messages 504 are received by the node 400 and analyzed by the agent 402. According to some embodiments, application 510 is one example of the agent 402 disclosed in FIG. 4. As such, application 510 includes the same modules as agent 402, including the Listener Module 404, the Interface to External Nodes Module 406, the Filter Module 408, and the Interface to Internal Sensors Module 410. Each module 404, 406, 308, 410 operate in the same manner as described previously. Internal sensor data 506 includes sensor data generated by all of the available sensors inherent to the host node 400 and as inherent to the host node 400. \Continuing with FIG. 5, the application system 500 includes several outputs 530. Outputs 530 include a broadcast message that is transmitted via the network 102 and directed to a specific distant node 400, or broadcast across all nodes 400 connected to the network 102. The outputs 530 also include status reports 534 that are generated by the agent 402 or application 510 and include analytic data on inherent sensors and broadcast message status. The status report 534 is delivered to a monitoring authority using the network 102 or other communications protocol.

Figure 6:
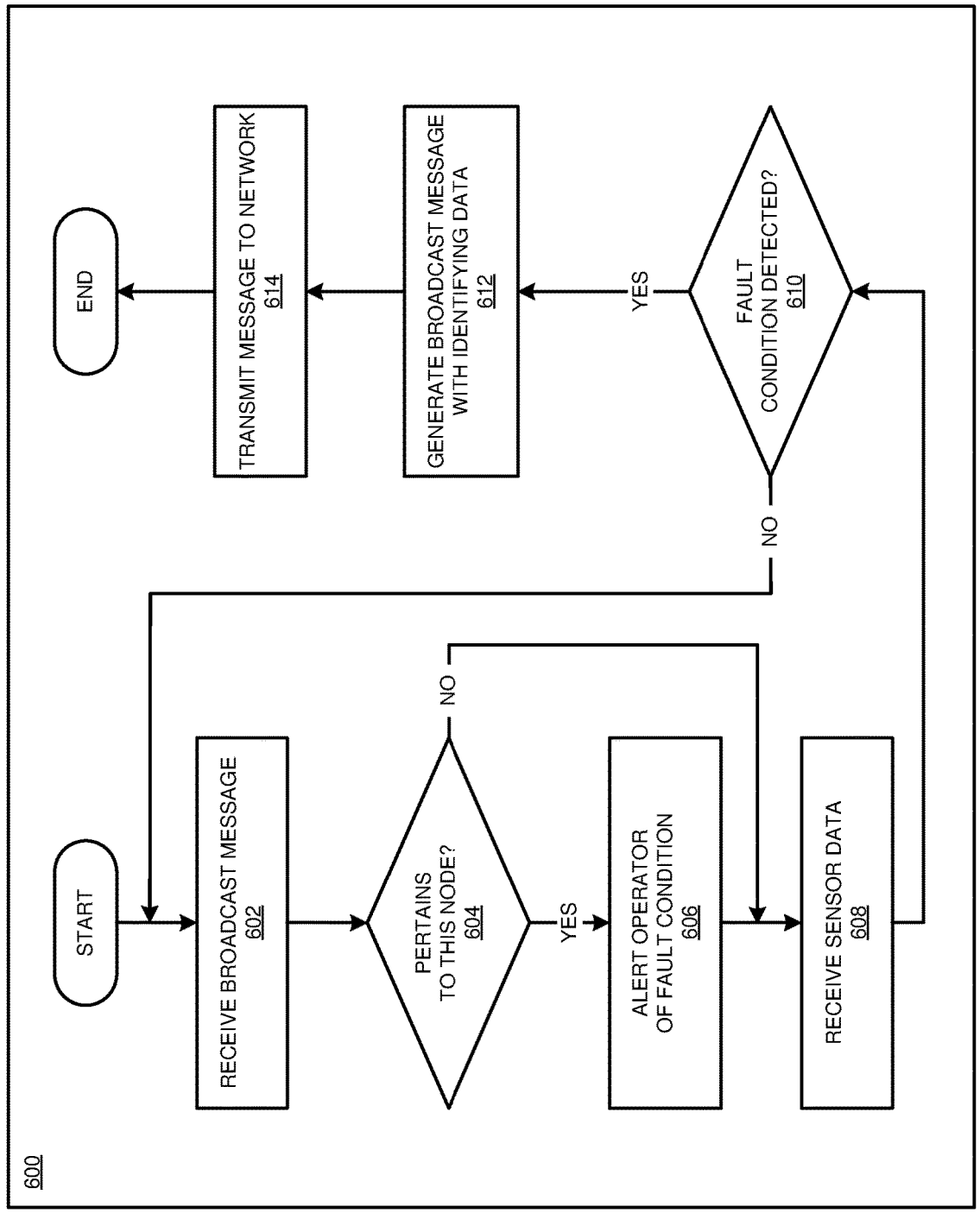
FIG. 6 depicts a flowchart of an example process for generating broadcast messages containing sensor data in accordance with an illustrative embodiment.

FIG. 6 depicts a flowchart of an example process 600 for generating broadcasts messages containing sensor data in accordance with an illustrative embodiment. The process 600 begins at block 602 where a node, such as node 400 of FIG. 4, receives a broadcast message 504 carrying information pertaining to sensor data. The broadcast message includes an ErrorHandler field structure 300 introduced in FIG. 3. Next, at decision block 604, the node 400 employs an agent, such as agent 402 of FIG. 4, to determine whether the broadcast message 504 is directed, or addressed to the node 400 receiving the broadcast message 504. The agent 402 employs a Filter Module 408 to determine the intended address of the fault condition message. If the response is "No", the process moves to block 608. If, however, the response is "Yes", the process 600 moves to block 606. Block 606 discloses generating an alert for a user or operator of the node 400 that a fault condition has been detected by an external or distant node 400 and that further action is necessary. The process 600 continues at block 608, where the agent 402 extracts sensor data from internal sensors by using the Interface to Internal Sensors Module 410. When sensor data is thus received, the process continues to decision block 610. If a fault condition is detected in a distant or external node 600, the process 600 continues to block 612. If, however, a fault condition in another node 600 is not detected, the process returns to the beginning of the process 600 at block 602. When a fault condition is detected with another node, either with the operation of the node 600, a fault with the sensors associated with the distant node 600, or both, a broadcast message is generated by the agent 402 using the Interface to External Nodes Module 406, and by creating a new ErrorHandler field structure 300. Finally, the process 600 ends when the newly-created broadcast message 504 transmits the message to the other nodes 400 connected to the communications network 102.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    joining, by a first node, a communications network connecting a set of nodes, wherein each node in the set of nodes comprises an agent and is associated with a sensor, and wherein the sensor associated with each node generates sensor data comprising a measurement of a physical property of an object, and wherein each node's agent sends and receives broadcast messages;
    generating, by the sensor associated with the first node, sensor data associated with a second node;
    analyzing, by a first node agent, the sensor data generated by the sensor associated with the first node, wherein the analyzing causes a detection of a first fault condition comprising a first sensor failure within the second node and detection of a second fault condition comprising a second sensor failure within the second node, the first sensor failure and the second sensor failure undetected by the second node;
    generating, by the first node agent, a broadcast message, wherein the broadcast message comprises the first fault condition detected by the first node agent, the second fault condition detected by the first node agent, and a subset of the sensor data generated by the sensor associated with the first node; and
    sending, by the first node, the broadcast message to at least one member of the set of nodes via the network.

2. The method of claim 1, wherein the broadcast message includes a field containing a subset of a set of parameters comprising sender identification, sender category, location, timestamp, and error code.

3. The method of claim 1, further comprising:
    receiving, by the first node agent, a broadcast message sent through the network;
    filtering, by the first node agent, the broadcast message to determine whether the broadcast message is addressed to the first node; and
    responsive to determining that the broadcast message is addressed to the first node, responding, by the first node, to the broadcast message by generating an alert to a user of the first node.

4. The method of claim 1, further comprising:
    joining, by a third node, the network, wherein the third node comprises an agent, and wherein the third node lacks a sensor.

5. The method of claim 1, wherein the one member of the set of nodes is the second node.

6. The method of claim 1, wherein the broadcast message is sent to the set of nodes, wherein the set of nodes includes the one member.

7. The method of claim 1, further comprising:
    identifying, by the first node, an identifier of the second node, wherein the identifier of the second node is included in the broadcast message.

8. The method of claim 1, further comprising:
    generating, by the first node agent, analytical data associated with the second node.

9. The method of claim 1, wherein the communications network is a Massive Internet of Things (MIoT) network.

10. A computer usable program product for generating a broadcast message containing sensor data pertaining to a fault condition, comprising one or more computer readable storage media, and program instructions collectively stored on the one or more computer readable storage media, the program instructions comprising:

program instructions to join, by a first node, a communications network connecting a set of nodes, wherein each node in the set of nodes comprises an agent and is associated with a sensor, and wherein the sensor associated with each node generates sensor data comprising a measurement of a physical property of an object, and wherein each node's agent sends and receives broadcast messages;

program instructions to generate, by the sensor associated with the first node, sensor data associated with a second node;

program instructions to analyze, by a first node agent, the sensor data generated by the sensor associated with the first node, wherein the analyzing causes a detection of a first fault condition comprising a first sensor failure within the second node and detection of a second fault condition comprising a second sensor failure within the second node, the first sensor failure and the second sensor failure undetected by the second node;

program instructions to generate, by the first node agent, a broadcast message, wherein the broadcast message comprises the first fault condition detected by the first node agent, the second fault condition detected by the first node agent, and a subset of the sensor data generated by the sensor associated with the first node; and program instructions to send, by the first node, the broadcast message to at least one member of the set of nodes via the network.

11. The computer usable program product of claim 10, wherein the broadcast message has a field containing a subset of a set of parameters comprising sender identification, sender category, location, timestamp, and error code.

12. The computer usable program product of claim 10, further comprising:

program instructions to receive, by the first node agent, a broadcast message sent through the network;

program instructions to filter, by the first node agent, the broadcast message to determine whether the broadcast message is addressed to the first node; and program instructions to, responsive to determining that the broadcast message is addressed to the first node, respond, by the first node, to the broadcast message by generating an alert to a user of the first node.

13. The computer usable program product of claim 10, wherein the stored program instructions are computer usable code stored in a computer-readable storage medium in a data processing system, and wherein the stored program instructions are transferred over the network from a remote data processing system.

14. The computer usable program product of claim 10, wherein the stored program instructions are computer usable code stored in a computer readable storage medium in a server data processing system, and wherein the computer usable code is downloaded over the network to a remote data processing system for use in a computer readable storage medium associated with the remote data processing system.

15. A computer system, comprising:

one or more processors, one or more computer-readable memories, one or more computer-readable storage media, one or more sensors, and an agent comprising:

a listener module, wherein a broadcast message is detected;

a filter module, wherein the broadcast message is interpreted to determine whether the agent is an intended destination of the broadcast message;

an interface to internal sensors, wherein the interface to internal sensors functions to enable connectivity among sensors in a first node; and an interface to external nodes, wherein the interface to external nodes functions to enable connectivity among different nodes in a given network of nodes; and program instructions to join, by a first node, a communications network connecting a set of nodes, wherein each node in the set of nodes comprises an agent and is associated with a sensor, and wherein the sensor associated with each node generates sensor data comprising a measurement of a physical property of an object, and wherein each node's agent sends and receives broadcast messages;

program instructions to generate, by the sensor associated with the first node, sensor data associated with a second node;

program instructions to analyze, by a first node agent, the sensor data generated by the sensor associated with the first node, wherein the analyzing causes a detection of a first fault condition comprising a first sensor failure within the second node and detection of a second fault condition comprising a second sensor failure within the second node, the first sensor failure and the second sensor failure undetected by the second node;

program instructions to generate, by the first node agent, a broadcast message, wherein the broadcast message comprises the first fault condition detected by the first node agent, the second fault condition detected by the first node agent, and a subset of the sensor data generated by the sensor associated with the first node; and program instructions to send, by the first node, the broadcast message to at least one member of the set of nodes via the network.

16. The computer system of claim 15, wherein the broadcast message has a field containing a subset of a set of parameters comprising sender identification, sender category, location, timestamp, and error code.

17. The computer system of claim 15, further comprising:

program instructions to receive, by the first node agent, a broadcast message sent through the network;

program instructions to filter, by the first node agent, the broadcast message to determine whether the broadcast message is addressed to the first node; and program instructions to, responsive to determining that the broadcast message is addressed to the first node, respond, by the first node, to the broadcast message by generating an alert to a user of the first node.

* * * * *